United States Patent [19]
Mochizuki

[11] Patent Number: 5,724,200
[45] Date of Patent: Mar. 3, 1998

[54] ELECTRICALLY POWERED REMOTE CONTROL REARVIEW MIRROR SYSTEM

[75] Inventor: Toshihiro Mochizuki, Fujieda, Japan

[73] Assignee: Murakami Kaimeido Co., Ltd., Shizuoka-ken, Japan

[21] Appl. No.: 586,293

[22] Filed: Jan. 16, 1996

[30] Foreign Application Priority Data

Jan. 18, 1995 [JP] Japan .................... 7-059688

[51] Int. Cl.⁶ ........................................... G02B 7/182
[52] U.S. Cl. ................................. 359/877; 359/872
[58] Field of Search .......................... 359/877, 872; 307/10.1

[56] References Cited

U.S. PATENT DOCUMENTS

| | | | |
|---|---|---|---|
| 4,403,829 | 9/1983 | Thujiuchi et al. | 350/289 |
| 4,930,370 | 6/1990 | Yoshida | 74/502.1 |
| 4,973,147 | 11/1990 | Fujita et al. | 359/877 |
| 5,238,214 | 8/1993 | Syamoto et al. | 248/544 |
| 5,294,084 | 3/1994 | Syamoto et al. | 248/544 |
| 5,311,368 | 5/1994 | Tsuyama | 359/874 |

Primary Examiner—Paul M. Dzierzynski
Assistant Examiner—Mark A. Robinson
Attorney, Agent, or Firm—Michael J. Striker

[57] ABSTRACT

The electrically powered remote control rearview mirror includes a mirror body (12); an actuator unit (15) including a housing (16, 17) having an outer surface with a convex portion (43) and a concave portion (46); mirror tilting motors (31, 32) inside the housing (16, 17) with motor terminals (31a,31a); wire harnesses (39) for electrical connection to the respective motors, each of which include harness terminals (37, 38) for electrical contact with respective motor terminals (31a,31a), and connectors (40) secured to the housing to maintain the electrical connection of the respective wire harnesses (39) to the motors. Each connector (40) is provided with a concave portion (41) facing the housing (16,17), two containing portions (42,42) on respective opposite sides of the concave portion (41) for holding the harness terminals (37, 38) of the wire harness (39), a concave groove (44) formed in peripheral wall top portions of the containing portions (42,42) in which the convex portion (43) is engaged and a pair of engaging pawls (45) protruding from an inside wall of the concave portion (41) into the housing (16, 17) and engaging the housing to firmly hold the connector (40) on the housing. The housing (16) includes two throughgoing slits (47) for each connector through which the harness terminals (37,38) are passed.

3 Claims, 3 Drawing Sheets

1

ELECTRICALLY POWERED REMOTE CONTROL REARVIEW MIRROR SYSTEM

BACKGROUND OF THE INVENTION

1. Field of the Invention

The present invention relates to an electrically powered remote control rearview mirror and more particularly to an outer rearview mirror in which an actuator unit for tilting a mirror angle are simply connected with an end portion of a wire harness.

2. Description of the Prior Art

Many conventional rearview mirrors are used for an automobile and a mirror angle can be vertically and horizontally adjusted by an electrically powered remote control. In the rearview mirror of that type, an actuator unit is disposed in a mirror body for holding a mirror holder which has a mirror and for adjusting a reflection angle.

As disclosed by U.S. Pat. Nos. 4,693,571 and 4,696,555, the actuator unit includes a first reversible motor and a drive transmission element for adjusting a vertical mirror reflection angle, a second reversible motor and a drive transmission element for adjusting a horizontal mirror reflection angle. An actuator unit housing has a center pivot for tiltably supporting the mirror. Movable pivots for vertically and horizontally adjusting the mirror reflection angle extend from an actuator unit housing, are spaced at predetermined distances in orthogonal directions from the center pivot and are received in pivot retainers formed on a rear surface of the mirror holder.

Each wire harness end conducted from an operation switch and an electric power source is inserted in the actuator unit and is connected with each terminal of vertical and horizontal mirror angle adjusting motors. First and second motors are actuated by an operation switch to reciprocate movable pivots provided with an adjusting nut, and the vertical or horizontal mirror reflection angle can be adjusted.

Due to a design condition of the rearview mirror, it has been necessary to minimize an actuator unit space which is located in the mirror body. Therefore a simple structure of a connecting part of motors and wire harness end portions in the actuator unit is necessary for smoothly connecting them to motor terminals in the unit housing.

Regarding the above, in a rearview mirror disclosed by Japanese Utility Model Registration Publication No. Hei 6-22606 filed by a same inventor of the present invention, a U-shaped connecting piece is previously assembled in the unit housing located at the connecting part of the motor terminal and the wire harness and a receptacle type contact of the wire harness end is inserted from a housing outside and is contacted with the U-shaped connecting piece having a first and a second contacts. That is a pair of terminal receiving cylinders are disposed at a predetermined position in a front half housing inside and a motor is disposed near to the cylinder. The U-shaped connecting piece is pressed into the motor side so as to contact the first contact of the U-shaped connecting piece with the motor terminal and the second contact is inserted into a slit which is formed on a top of the terminal receiving cylinder. Thereafter the receptacle type contact which is fixed on the wire harness end portion is inserted through the terminal receiving cylinder from the housing outside and is contacted with the first contact of the U-shaped connecting piece, whereby the motor and the wire harness are connected with each other.

There is a problem, however, in the rearview mirror described in the Utility Model Registration because the U-shaped connecting piece(connecting member) is necessary for connecting the motor with the receptacle contact. Further when the receptacle contact fixed on the wire harness is inserted into the terminal receiving cylinder, a complicated adjustment is necessary for adjusting the slit direction with a contact surface of a female type, contacting piece forming the receptacle contact. As a result there is an adverse effect on the adjustment.

SUMMARY OF THE INVENTION

Considering the problems described hereinbefore, it is an object of the present invention to provide an electrically powered remote control rearview mirror in which the wire harness end can be easily connected to the motor in the actuator unit housing and the housing is a waterproof and dustproof.

To achieve the object described above, in the electrically powered remote control rearview mirror of the present invention, a connector which holds a terminal of a wire harness end is directly contacted with a motor terminal and is simultaneously attached on a housing rear surface.

According to the invention, the electrically powered remote control rearview mirror with means for horizontally and vertically tilting a mirror surface comprises a mirror body; an actuator unit including an actuator unit housing having an outer surface provided with a convex portion and a concave portion and means for adjusting a tilting angle of the mirror surface including mirror tilting motors inside the actuator unit housing and provided with a motor casing and motor terminals; a wire harness for electrical connection to one of the motors including harness terminals for electrical contact with the respective motor terminals and a connector secured to the outer surface of the housing to maintain electrical connection of the wire harness to the one motor. The connector is provided with a concave portion facing the housing, two containing portions on respective opposite sides of the concave portion for holding the harness terminals, a concave groove formed in peripheral wall top portions of the containing portions in which the convex portion on the housing engages and a pair of engaging pawls protruding from an inside wall of the concave portion of the connector into the housing and engaging the housing to firmly hold the connector on the housing so as to hold the harness terminals in contact with the motor terminals. The housing includes at least two throughgoing slits in the vicinity of the one motor through which the harness terminals are passed, the engaging pawls engage with the housing in the concave portion of the housing and the convex portion of the connector extends around the at least two throughgoing slits and the concave portion. The connector is also provided with an entrance portion for inserting the wire harness which is open on one end of the connector.

In accordance with a preferred embodiment of the invention, respective upper half portions of harness terminals contained in the containing portions are inserted through two of the slits respectively to contact with the motor terminals and the connector is attached to the outer surface of the actuator unit housing.

In another preferred embodiment a wire harness and connector of the above-described type are provided for both of the mirror tilting motors.

The actuator unit for adjusting the mirror reflection angle includes movable pivots which is disposed in the actuator unit housing spaced with a certain distance in the orthogonal direction from the center of the actuator unit for vertically and horizontally adjusting the reflection angle, pivot retainers formed on the mirror holder rear surface for engaging movable pivots, first and second motors for adjusting the reflection angle and the drive transmission element which are disposed in the actuator unit housing and the adjusting nut formed on each movable pivot.

The terminal of the wire harness end is contained in the containing portion of the connector, the upper half portion of the terminal is inserted into the slit of the housing outer surface and the end portion thereof is contacted with the motor terminal, and simultaneously the fitting means (irregular portion) and the engaging means (engaging pawl portion and engaging concave portion) are actuated, whereby an attachment of the connector on the housing outer surface and a motor wiring can be achieved by a one touch operation.

The above and other objects, features and advantages of the present invention will become apparent from the following description and the appended claims taken in conjunction with the accompanying drawings which shows by way of example preferred embodiments of the present invention and in which like component parts are designated by like reference numerals throughout the various figures.

BRIEF DESCRIPTION OF THE DRAWINGS

In the accompanying drawings.

DETAILED DESCRIPTION OF THE PREFERRED EMBODIMENT

Figure 5:
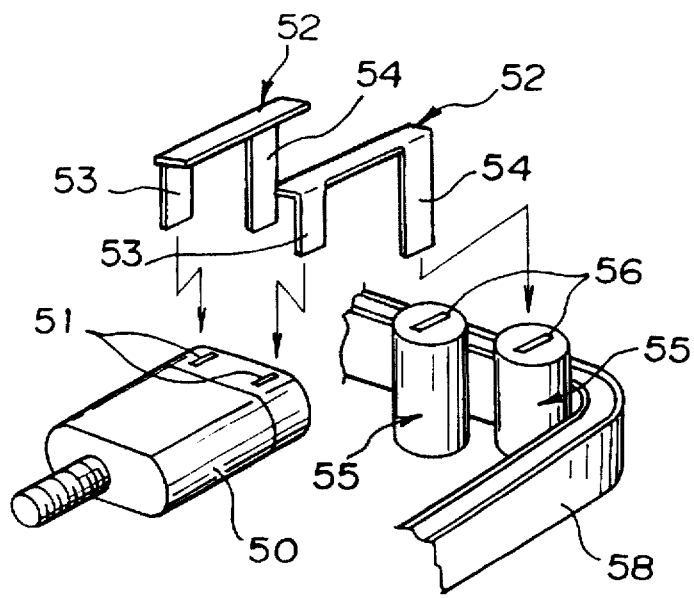
FIG. 5 is a perspective view of an example of a connecting structure of the conventional rearview mirror.
Figure 6:
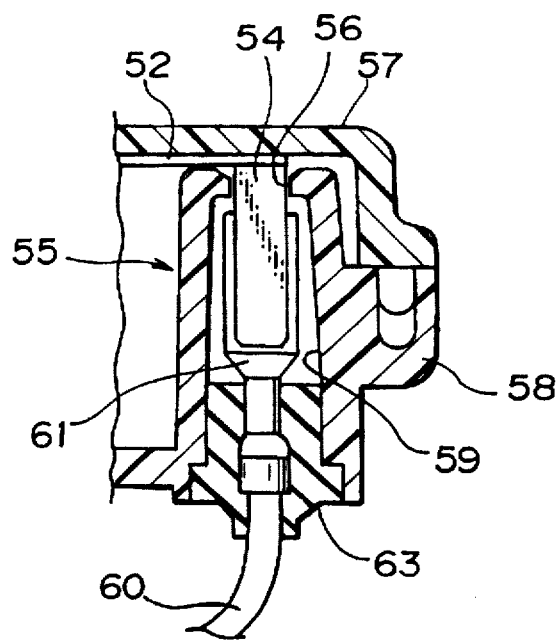
FIG. 6 is an enlarged view of the connecting structure of the rearview mirror of FIG. 5.

In a conventional rearview mirror disclosed by Japanese Utility Model Registration Publication No. Hei 6-22606, a U-shaped connecting piece is assembled in the connecting part of a motor terminal in an actuator unit housing and a wire harness and a receptacle type contact of the wire harness terminal is inserted through the housing outside and is contacted with the U-shaped connecting piece. FIG. 5 shows a prior art rearview mirror assembly in which a half rear housing is removed and an arrangement of a half front housing 58, a motor 50 and a U-shape connecting piece 52 is shown. Both ends of the U-shape connecting piece 52 are downwardly bent and contacts 53, 54 are integrally formed therewith. At a certain position in the half front housing 58, a pair of terminal receiving cylinders 55 are formed. The motor 50 disposed near the terminal receiving cylinder 55 contains a pair of terminals 51, 51 in a motor casing. The U-shape connecting pieces 52, 52 are pressed into the arrow direction indicated by FIG. 5, first contacts 53,53 of the U-shape connecting pieces are contacted with the motor terminals 51,51 and the second contacts 54,54 are inserted into the slits 56 which are formed in top portions of the terminal receiving cylinders 55. Under the condition described above, a receptacle type contact 61 which is fixed on an end portion of a wire harness 60 is inserted into the terminal receiving cylinder from the housing outside, whereby the second contact 54 of the U-shape connecting piece contacts with the contact 61 to perform the motor wiring. Further as shown by FIG. 5, a grommet 63 is provided on an end portion of the wire harness 60 and is secured on a terminal receiving cylinder 59 so that the wiring portion is protected from rain drops and the dust from the outside.

There is a problem, however, in the connecting structure of the actuator unit with the wire harness of the rearview mirror taught by the Utility Model Registration described hereinbefore. The connecting member (U-shape connecting piece 52) is necessary for connecting between the motor terminals 51 and the receptacle 61. Further when the receptacle 61 fixed on the wire harness 60 is inserted into the terminal receiving cylinder 55 and is sealed by the grommet 63, it is required that a contacting surface of the receptacle 61 and the slit 56 direction must be adjusted. Moreover the grommet 63 is previously provided through the wire harness and thereafter the receptacle 61 is inserted into the terminal receiving cylinder 55 to be sealed by the grommet 63, thereby the assemble working effect is deteriorated. The receptacle 61 is fixed only by an engagement of the grommet 63. The sufficient fixing of the receptacle 61 to the terminal receiving cylinder 55 cannot be achieved, and the wire harness 60 may be loosened by pulling.

The preferred embodiment of the present invention is described in FIGS. 1 to 4.

Figure 1:
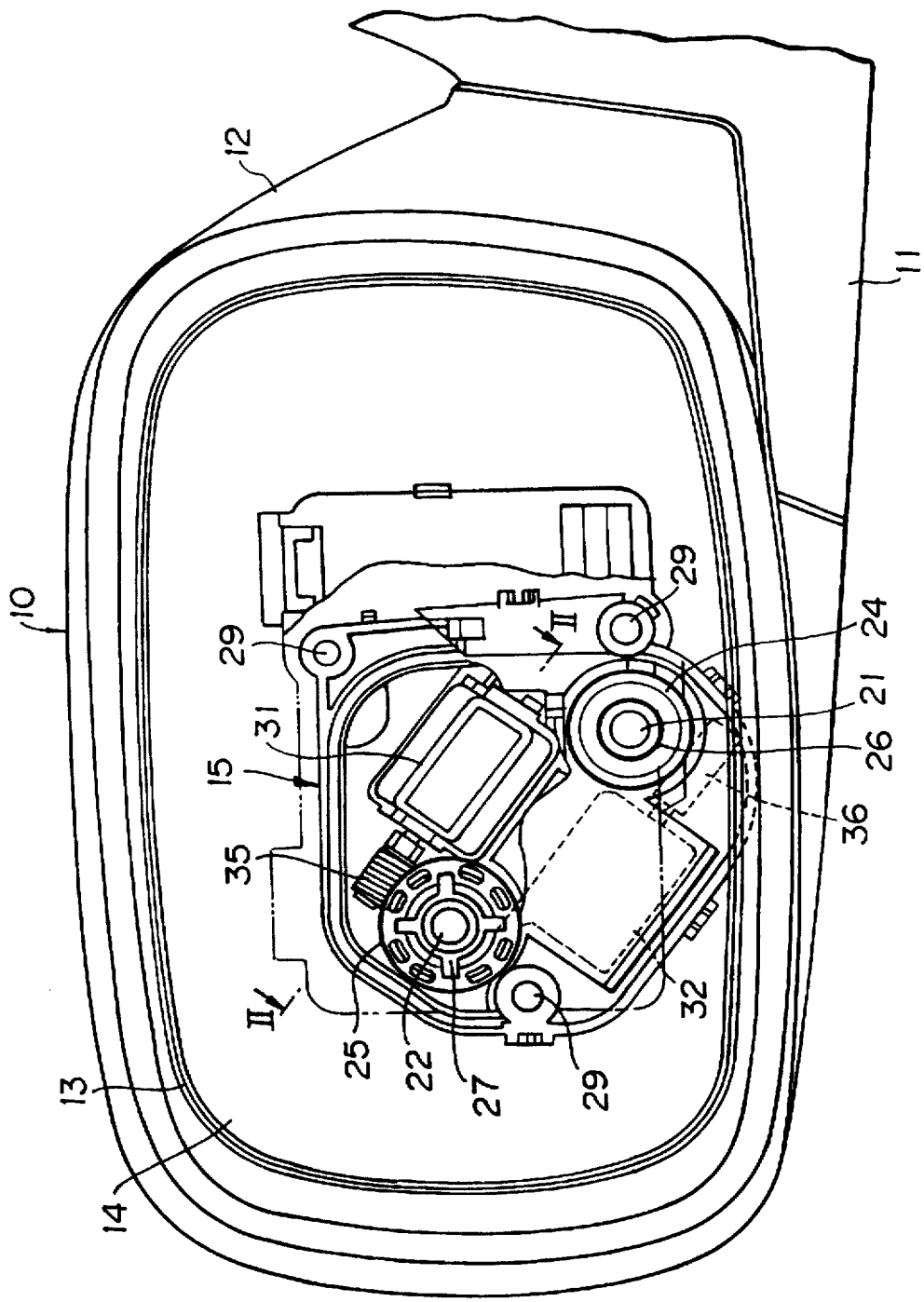
FIG. 1 is a partially cut-away front view of a rearview mirror assembly according to the preferred embodiment of the present invention.

In FIG. 1 which is a partially cut-away front view of a rearview mirror assembly, a left side rearview mirror is shown.

In a rearview mirror assembly 10, a mirror body 12 is rotatably attached on a base 11 which is fixed on the automobile outer panel. An actuator unit 15 for tilting or adjusting mirror angle is disposed in the mirror body 12 and a mirror element 14 supported by a mirror holder 13 is attached incapable of adjusting the tilting angle thereof.

In the rearview mirror assembly 10, the mirror holder 13 having a mirror element 14 is supported in the mirror body 12 and the actuator unit 15 for adjusting the reflection angle of the mirror is also provided therein. A concave groove 18 of the peripheral edge of a front half housing 16 and a protruding strip 19 of a rear half housing 17 are engaged with each other to form the actuator unit 15 housing. Necessary parts such as motors 31, 32 and a drive transmission element are contained in the housing, the front housing 16 and the half rear housing 17 are engaged with each other, and the actuator unit is fixed in the mirror body 12 inside via screws 29 inserted through small holes formed on the peripheral edge portion (see FIG. 1).

Like the mirror holder disclosed by U.S. Pat. Nos. 4,693, 571 and 4,696,555, the mirror holder 13 is detachably provided with a pivot plate on a rear surface thereof and the pivot plate includes a center pivot and a pivot retainer for vertically and horizontally adjusting the reflection angle of the mirror. The center pivot is engaged in a concave spherical surface shaped socket which is formed on the half rear housing 17. A spherical trapezoidal cap is inserted and engaged in the center pivot inside and the center pivot is fastened with a certain torque by a tapping screw and a helical spring, whereby the mirror is supported on a rear surface of the actuator unit. Further in the actuator unit 15, movable pivots 21, 22 for adjusting vertical and horizontal reflection angle are respectively projected from the rear housing 17 spaced with a certain distance in the orthogonal direction from the center pivot and are engaged in the pivot retainer.

First and second reversible motors 31, 32 are disposed in the housing and are spaced from each other (FIG. 1). Each terminal 31a, 31a of these motors is connected to terminals 37,38 of an end of a wire harness 39 (FIGS. 2 and 3) as described hereinafter and the wire harness 39 is also connected to the control circuit (not shown).

Figure 2:
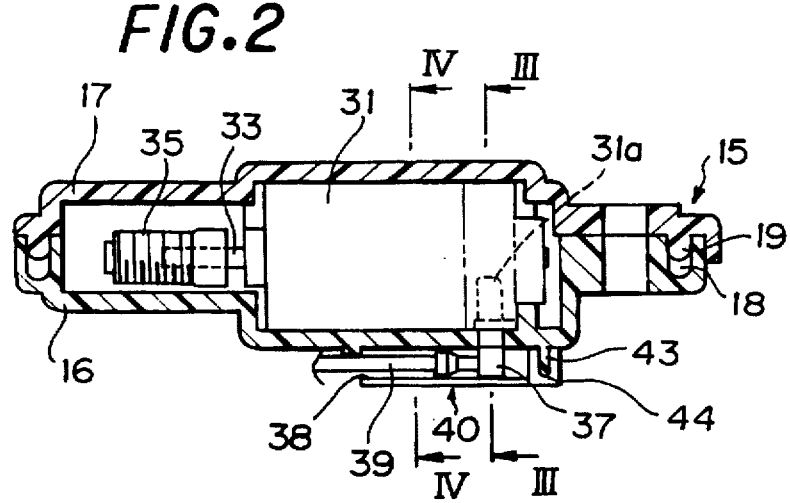
FIG. 2 is an enlarged vertical section view of the rearview mirror of FIG. 1 taken along the line II—II in FIG. 1.
Figure 3:
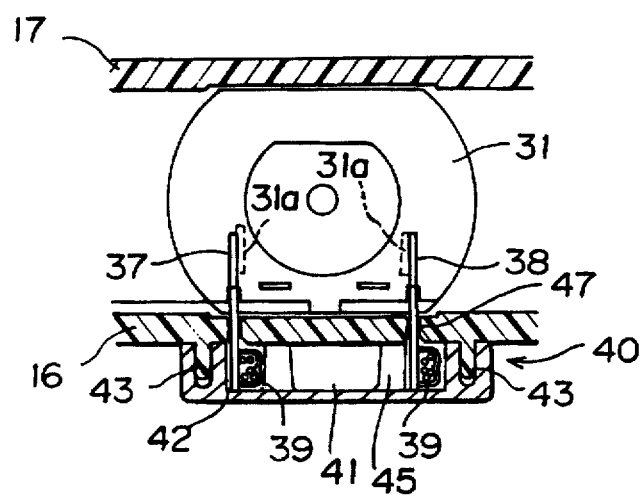
FIG. 3 is an enlarged section view of the rearview mirror of FIG. 2 taken along the line III—III in FIG.
Figure 4:
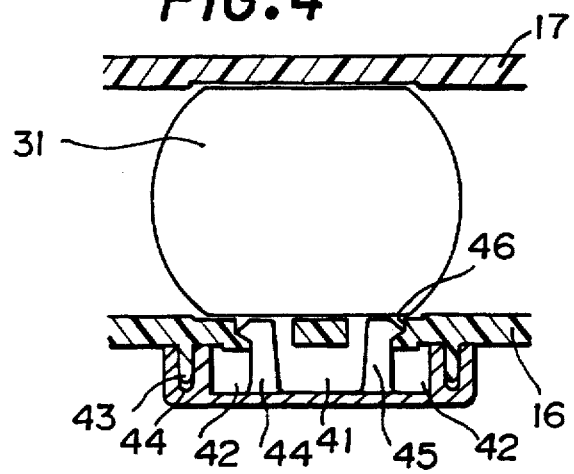
FIG. 4 is an enlarged section view of the rearview mirror of FIG. 2 taken along the line IV—IV in FIG. 2.

On the outer surface of the housing of the actuator unit 15 (the front half housing 16 is shown by FIGS. 2 to 4), a convex portion 43 and a concave portion 46 are formed. The mirror tilting motor 31 which is disposed in the actuator unit includes motor terminals 31a, 31a in the motor casing. A connector 40 for the motor wiring is attached on the housing outer surface of the actuator unit.

Further the housing of the actuator unit 15 includes the connector engaging convex portion 43 which is disposed portion of the housing outer surface, concave portions 46 and a pair of slits 47 which are formed at the approximately center of an area surrounded by the convex portion 43. The connector 40 has a concave portion 41 formed on an upper side of the connector main body which has an approximately rectangular shape in respect of the plane surface. Containing portions 42, 42 are formed at both sides of the concave portion 41 to hold terminals fixed on the wire harness 60 end. A concave groove 44 is formed in each periphery wall top portion of the concave portions 41 capable of engaging with the convex portion 43 and a pair of engaging pawls 45 extending from the inside wall of the concave portion 41 so as to engage with the concave portion 46.

The engaging convex portion 43 is formed on the housing outer surface which relates to at least three edges of the rectangular peripheral wall top portion of the connector main body.

As described hereinbefore, each upper half portion of terminals 37, 38 of the wire harness end which are contained in containing portions 42, 42 is inserted into the slit 47, 47 and the end portion thereof is contacted with the motor terminal 31a, 31a, and simultaneously the connector 40 is attached on the housing outer surface. That is the upper half portion of the terminal of the wire harness end which is contained in the connector containing portion is inserted into the slit on the housing outer surface and the end portion thereof is contacted with the motor terminal, and simultaneously fitting means (irregular portion) and engaging means (engaging pawl and engaging concave portion) are actuated, thereby the attachment of the connector on the housing outer surface and the motor wiring can be achieved by one touch operation.

Except for adding further force exceeding the predetermined outer force, the connection of the motor terminal and the wire harness in the connector 40 cannot be released. The housing inside is protected from rain drop flooding and the dust by an engagement construction between the connector and the wire harness and further it can be most protected by filling a sealing element (not shown) at an entrance portion 48 of the connector.

In accordance with the present invention, the terminal of the wire harness end is directly contacted with the motor terminal, and number of assembly parts can be reduced without the necessity of using intermediate connecting pieces. The engaging portion is provided between the connector and the housing, and the motor terminal and the wire harness can be completely connected with each other only by inserting the connector to the motor in the housing via the connecting portion without a complicate assembly process. Therefore, a simple assembly and cost reduction can be achieved.

It is further understood by those skilled in the art that the foregoing example is a preferred embodiment of the disclosed device and various change and modifications may be made in the invention without departing from the spirit and scope thereof.

We claim:

1. An electrically powered remote control rearview mirror with means for horizontally and vertically tilting a mirror surface, said rearview mirror comprising a mirror body (12), an actuator unit (15) comprising an actuator unit housing (16, 17) having an outer surface provided with a convex portion (43) and a concave portion (46) and means for adjusting a tilting angle of the mirror surface including mirror tilting motors (31, 32) inside the actuator unit housing (16, 17), each of said motors having a motor casing and motor terminals (31a,31a) in the motor casing, a wire harness (39) for making an electrical connection to one (31) of the motors (31,32), said wire harness including harness terminals (37, 38) for making electrical contact with the respective motor terminals (31a, 31a) of said one of the motors, and a connector (40) for maintaining said electrical connection of said wire harness (39) to said one (31) of the motors, said connector (40) being engaged on the outer surface of the actuator unit housing (16, 17);

wherein the connector (40) is provided with a concave portion (41) facing the housing (16,17), two containing portions (42,42) on respective opposite sides of the concave portion (41) for holding the harness terminals (37, 38) of the wire harness (39), a concave groove (44) formed in peripheral wall top portions of the containing portions (42,42), said convex portion (43) engaging in said concave groove (44), and a pair of engaging pawls (45) protruding from an inside wall of the concave portion (41) into the housing (16, 17) and engaging the housing to firmly hold the connector (40) on the housing so as to contact the harness terminals (37, 38) with the motor terminals (31a,31a);

wherein the housing (16) includes at least two throughgoing slits (47) in the vicinity of said one (31) of the motors through which said harness terminals (37,38) are passed, the engaging pawls (45) engage with the housing in the concave portion (46) of the housing and the convex portion (43) of the connector (40) extends around the at least two throughgoing slits (47) and the concave portion (46); and wherein the connector (40) having the concave groove (44) and the engaging pawls (45) protruding from the inside wall of the concave portion (41) is provided with an entrance portion (48) for inserting the wire harness (39) and said entrance portion (48) is open on one end of the connector (40) for insertion of the wire harness.

2. The rearview mirror as defined in claim 1, wherein respective upper half portions of harness terminals (37, 38) contained in the containing portions (42, 42) are inserted through two of said at least two slits (47, 47) respectively, the upper half portions are contacted with the motor terminals (31a, 31a) and the connector (40) is attached to the outer surface of the actuator unit housing (16, 17).

3. The rearview mirror as defined in claim 1, further comprising another wire harnesses for making an electrical connection to another (32) of said motors (31,32) and another of said connectors (40) for maintaining said electrical connection of said another wire harness to said another (31) of said motors.

* * * * *